Patented Apr. 25, 1950

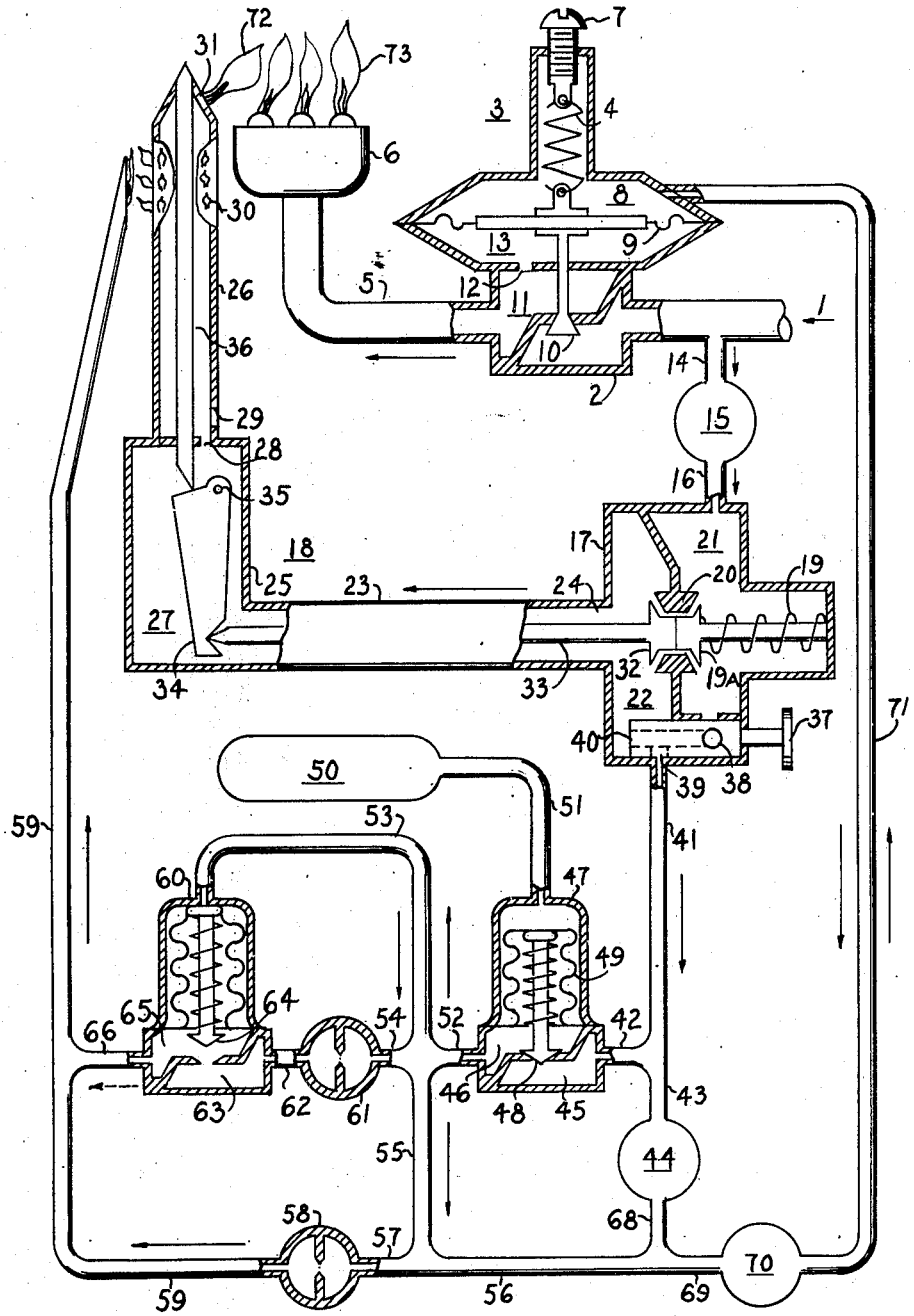

2,504,964

UNITED STATES PATENT OFFICE 2,504,964

BURNER CONTROL SYSTEM

Lewis L. Cunningham, Sherman Oaks, Calif.

Application October 30, 1945, Serial No. 625,526

8 Claims. (Cl. 236—1)

1

This invention relates to improvements in heat regulating devices and has for general and broad objects to provide means for modulating or regulating the flow of fluids in proportion to the demand for such flow, such demand being determined by variation in temperature or other conditions.

A main object of the invention is to provide means to modulate, for example, gas flow to a burner in a pre-determined ratio to the temperature between pre-determined limits at a chosen location and to modify this ratio in a required manner in order to meet the flow requirements of the burner.

It is well known that in order to maintain a relatively constant temperature in, for example, an occupied space it is necessary to modulate, or proportion, the flow of heat to the space in accordance with the temperature changes and to avoid in so far as is practicable abrupt changes in the flow of heat. It is also well known that gas burners, for example, do not operate properly when the flow of gas to them is not maintained between definite limits and in particular, their operation is unsatisfactory when the rate of gas flow is relatively low and, in fact, they ordinarily cannot be lighted successfully if the gas pressure supplied to them at the time of lighting is not a relatively high percentage of the maximum pressure for which they are designed.

Features of this invention include the broad idea of modulating the pressure of gas supplied to a burner in response to variation of a variable such as temperature within limits suitable for proper burner operation and when the demand for heat tends to result in a gas pressure less than is suitable for proper burner operation to abruptly shut off the flow of gas and when the flow of gas has thus been cut off to again supply gas pressure to the burner only when the demand is such that the corresponding pressure is great enough for the burner to light properly. A further object is to provide means for cutting off all gas flow if the pilot light for the burner has become extinguished and to permit the pilot to be lighted manually without the possibility of gas being supplied to the main burner while the pilot is being lighted.

Reference is now made to the drawing, the single figure of which is a diagrammatic view of a control system embodying the invention.

At 1 is shown gas supply to the valve body 2 of the pressure regulator shown generally at 3. The regulator is not conventional in the respect that the loading spring 4 is, in the arrangement

2 shown, in tension instead of compression as would be the case if the regulator were to maintain a definite output pressure in the conduit 5 leading to the burner 6. The normal tension of the spring 4 by the adjusting means 7 is such that if no pressure relative to that of the atmosphere exists in the space 8 above the diaphragm 9 of the regulator 3 when the valve 10 is closed and no gas can pass into the space 11 and to the burner. Upon admission of sufficient pressure into the space 8 the reaction of the spring 4 is overcome and gas passes into the space 11 and the resulting gas pressure passes through the opening 12 into the space 13, and as well as through the conduit 5 to the burner 6. The increase of pressure in the space 13, and therefore on the underside of the diaphram 9 tends to balance the increased pressure in the space 8 against the upper side of the diaphram 9 and the resultant action tends to close the valve 10 and therefore to maintain a pressure in the space 11 which is proportional to the pressure in the space 8. It will be seen that the action of the regulators 3 differs from that of conventional pressure regulators in that the output pressure is a function of the algebraic sum of the forces of the spring 4 and the pressure in the space 8.

Leading from the gas supply 1 is the pipe 14 to a conventional small capacity pressure regulator 15 and the pipe 16 leading from the regulator 15 to the valve body 17 of the safety pilot assembly shown generally at 18.

The safety pilot 18 comprises a spring 19 tending to close the valve 19A against the seat 20 and therefore to prevent passage of gas from the space 21 of the valve body 17 to the space 22 of the valve body 17. Provision is made for gas in the space 22 to pass into the pipe 23 through the opening 24. The pipe 23 connects into the fitting 25 on which the burner tube 26 of the safety pilot 18 is mounted. The space 27 of the fitting 25 is provided with the orifice 28 through which gas in the space 27 may escape into the tube 26 and in so doing may entrain air entering through the opening 29 in the tube 26, thus forming a combustible mixture in the tube 26 after the manner of the well known Bunsen burner. The combustible mixture may escape and burn at the multiple heater openings 30 and the ignition opening 31. Combustion at the openings 30 raises the temperature of the tube 26 causing it to lengthen thus permitting the spring 19 to move the valve element 19A towards a closed position and the valve element 32 towards an open position, restraint for the valve motion being afforded by the rod 33, the lever arm 34 pivoted at 35 and the rod 36, as shown. The tube 26 and the rod 36 are materials having a high temperature coefficient of expansion so that their relative lengths are altered by difference in temperature. The tube 23 and the rod 33 are of materials which have like, but preferably low, coefficients of expansion. Adjustments are made by means not shown so that when the tube 26 is not heated and the tube 26 and the rod 36 and also the tube 23 and the rod 33 are therefore at normal relative lengths the valve 32 is closed but when the tube 26 is heated by normal combustion at the openings 30 the valve 32 is open sufficiently to pass gas for the safety pilot 18 and also for the control devices hereinafter described. The spacings of the valves 19A and 32 with respect to the double faced seat 20 are such that at normal operating temperature of the tube 26 the valves 19A and 32 are substantially equi-distant from the seat 20 so that abnormally high temperature of the tube 26 or failure of any of the mechanism of such a nature as to more fully open the valve 32 will result in closure of the valve 19A thus limiting, or shutting off, gas flow to the safety pilot and to the control devices yet to be described.

Shown generally at 37 is a three-way valve arranged by means of ports 38, 39 and 40 so that normally gas may pass from the space 22 through the ports 40 and 39 to the pipe 41 but upon operation of the valve 37 gas may be passed through the ports 38 and 40 from the space 21 to the space 22 but when the valve 37 is in this position, gas may not pass through the port 39 to the pipe 41. This arrangement makes it possible to light the safety pilot and to prevent operation of associated mechanisms while this is being done.

Pipe 41 leads to branch pipes 42 and 43, the latter leading to a low limit device 44 whose function is described hereinafter. The branch pipe 42 leads into the space 45 separated from the space 46 of the condition responsive valve shown generally at 47 and whose valve member 48 separates the spaces 45 and 46. The valve 48 responds by means of the diaphragm, or bellows 49, to the temperature sensitive member 50 which is suitably connected by the tubing 51 so that rise of temperature at the bulb 50 results in closure of the valve 48. The space 46 is connected by the pipe 52 to the branch pipes 53, 54 and 55. Branch pipe 55 leads to the branch pipes 56 and 57, the latter leading to the restriction 58 from which the pipe 59 leads to the combustion zone of the safety pilot 18 where it is open ended and issuing gas may be burned.

The pipe 54 leads to the restriction unit 61 from which the pipe 62 leads to the space 63 of the pressure sensitive valve shown generally at 60 and whose valve member 64 separates the space 63 from the space 65, the latter being vented to atmosphere or connected to the pipe 59 by the pipe 66.

The valve member 64 is adjusted by means not shown so that when no pressure is supplied by the pipe 53 it remains open and fluid passing through restriction 61 does not build up pressure in space 63.

The pipe 43 connects pipes 41 and 42 to the condition responsive valve shown generally at 44, the valve element of which, not shown, is normally closed. Valve 44 is connected by pipe 68 to pipe branches 56 and 69, the latter leading to the condition responsive valve shown generally at 70 and whose valve member is normally open. The valve 70 is connected by the pipe 71 to the space 8 of the regulator 3.

The safety pilot 18 is arranged so that ignited gas issuing from the opening 31 burns, as at 72, and is in condition to ignite gas issuing from the openings 73 of the burner 6.

Normally heat generated at the burner 6 heats the space in which the bulb 50 is located, but conditions may be found where this is not desirably the case, as for example when a building is to have heat supplied as a function of outside temperature only.

It is well known that fluid flow is always accompanied by pressure drop and that the pressure drop is proportional to the rate of flow and to the amount of restriction or resistance to flow. In general restriction of flow is inversely proportional to the size of the channel through which flow takes place. In order to fully explain the function of the valve 60, it is necessary to assume that gas pressure is available in the space 45 and that the valve element 48 may have any degree of opening, within its capacity. It is also necessary to assume that the condition operated valve 44 is closed and that the condition operated valve 70 is open, as set forth in lines 19 to 28, Column 6, this being the condition for normal operation. Under these conditions pressure in the space 46 is transmitted equally to the pressure sensitive portion of the valve 60 and to the space 8 of the main valve 3. It is set forth in lines 10 to 28, Column 2, that the pressure supply to the burner 6 is proportional to the pressure in the space 8. It is therefore apparent that the pressure supply to the burner is proportional to the pressure in the space 46 and conditions which affect this pressure also affect the pressure supply to the burner. The conditions which affect the pressure in the space 46 are: (a) pressure in the space 45, (b) the degree of opening of the valve 48, (c) the magnitude of the flow restrictions 61 and 58 and (d), the position of the valve 64. Pressure in the space 65 is taken as atmospheric, or gauge pressure.

For convenience, let the pressure in the space 45 be noted by P and the atmospheric pressure in the space 65 by Po. Let the pressure in the space 46 be denoted by Px. If the valve 48 is closed then Px is equal to Po, since under these conditions valve 64 is open. If the valve 48 is slightly open then Px is greater than Po by an amount which is inversely proportional to the combined flow resistance of restrictions 58 and 61, assuming that the valve 64 is effectively open. (It will be seen that this valve cannot occupy a throttling position since, because, as described below, its closure on an increasing pressure results in increasing closure pressure and its opening on a decreasing pressure results in decreasing the pressure tending to cause it to close). As the valve 48 opens wider Px increases and the pressure actuated valve 60 may be adjusted so that the valve 64 will close at a desired value of Px. When the valve 64 closes no further flow takes place through the restrictions 61 and Px rises suddenly by an amount which is proportional to the ratio of the flow restriction value of restriction 58 to that of restriction 61, and to the size of the opening through the valve 48. The spring 4 may be adjusted so that the valve 10 opens in response to this sudden increase in pressure and thus the burner supplied with ample lighting pressure. Conversely, as the valve 48 tends toward closure Px decreases until it reaches a value lower than that at which the valve 64 closed while Px was rising. As this lower pressure is reached the valve 64 opens slightly, permitting passage of gas through the restriction 61 and therefore lowering Px. This initial lowering of Px still further opens valve 64 and Px suddenly drops to a value which is definitely lower than that which caused closure of the valve 64 when Px was rising. Pressure supply to the burner 6 is therefore cut off suddenly.

The operation of the invention may now be described:

If there is no flame at the ports 30, and therefore none at the ports 73 the valve 32 will be closed as described. The valve 37 may be operated to close the port 39 and open port 38 thus connecting the spaces 21 and 22, admitting gas to the safety pilot unit. Upon ignition of the combustible mixture, as described, at the ports 30, the tube 26 is heated permitting the spring 19 to open the valve 32 admitting gas to the space 22 independently of the valve 37. The valve 37 may now be returned to the operating position and gas continues to be supplied to the safety pilot 18 and also to the pipe 41 and therefore to the space 45.

The valve 44 is normally closed so that no gas passes through pipe 43. If it is assumed that the temperature at the bulb 50 is such that the valve 48 is slightly opened it is seen that pressure tends to rise in pipe 52 and all connected piping and spaces. This tendency toward pressure rise is held back by passage of gas through the restriction 61 and then through the normally open valve 64, and also through the restriction 58. The escaping gas is burned, if desired, by being discharged through the pipe 59 to the pilot flame. As pressure in space 46 and connected spaces rise due to the continued lowering of temperature of the bulb 50 the valve 64 tends towards closure and as it approaches complete closure the gas passage through it is restricted with a resulting pressure rise in space 46 and all connected spaces. This action is cumulative with the result that valve 64 closes suddenly at a pre-determined pressure and immediately thereafter a higher pressure is set up in space 46 and connected spaces. By a suitable ratio between the restrictions 58 and 61 the set-up in pressure resulting from the closure of valve 64 in space 46 and connected spaces may be pre-determined as desired. The pressure changes, as described, are connected to the space 8 of the regulator 3 and by suitable adjustment of the tension of the spring 4 the valve 10 remains closed until the valve 64 closes, as described, and upon its closure the valve 10 may open to supply regulated pressure as desired to the burner 6. After the burner 6 has been lighted, the pressure supplied to it varies inversely with the temperature of the bulb 50 since, as the temperature of the latter drops, more gas passes through the valve 48 and the pressure in the space 8 rises, requiring a higher pressure in the space 13, and therefore to the burner 6, to balance it.

It is further seen that as the temperature of the bulb 50 rises the pressure in space 46 and connected spaces lowers and at a pre-determined pressure, lower than for the opening cycle above described, the valve 64 opens slightly, permitting the passage of gas through it with a consequent sudden drop in pressure in the space 46 and connected spaces and a sudden further opening of the valve 64. The regulator 3 may be adjusted to completely close the valve 10 on this drop in pressure.

It is seen that the described arrangement provides means for modulating gas pressure to a burner in accordance with the demand for heat; to abruptly supply suitable lighting pressure and to abruptly cut off all pressure when the demand for heat has ceased, and also to cut off all gas supply upon extinguishment of the pilot flame or upon structural failure of the safety pilot.

The definite example of the control of a gas burner in response to a demand for heat has been selected to describe this invention but I desire not to be limited to the use of this example since there are many other uses to which it may be applied. And in particular, many other throttling means than a thermally actuated valve may be used instead of the valve 47.

The condition operated valve 44 is normally closed and has the function of a low limit control so that under conditions for which it is adjusted its valve may open and cause gas to be supplied to the burner 6 even though the valve 48 may be closed.

The condition operated valve 70 is normally open but closes when conditions to which it is subjected are such that is desired to prevent gas supply to the burner 6.

I claim as my invention:

1. In a burner control system: a burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, means permitting continuous but variable bleed of fluid from said first chamber to the atmosphere, said means comprising a valve responsive to the pressure in said first chamber and adapted to decrease the bleed of fluid from said first chamber when the pressure therein rises above a first predetermined value and to increase the bleed of fluid from said chamber when the pressure therein decreases below a second predetermined value.

2. In a burner control system: a burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, means permitting continuous but variable bleed of fluid from said first chamber to the atmosphere, said means comprising a valve responsive to the pressure in said first chamber and adapted to decrease the bleed of fluid from said first chamber when the pressure therein rises above a first predetermined value and to increase the bleed of fluid from said chamber when the pressure therein decreases below a second predetermined value, said second predetermined value being at a lower absolute pressure than said first predetermined value.

3. In a burner control system: a burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, a first restricted passage for continuously bleeding fluid from said first chamber to atmosphere, a second passage for intermittently bleeding fluid from said first chamber to atmosphere, a valve responsive to the pressure in said first chamber controlling fluid flow through said second passage and adapted to close said second passage when the pressure in said first chamber increases above a first predetermined value and to open said second passage when the pressure in said first chamber decreases below a second predetermined value.

4. In a burner control system: a burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, and a by-pass for said throttling valve controlled by a normally closed low limit valve which, when moved to open position, removes said throttling valve from control of flow through said passage, a first restricted passage for continuously bleeding fluid from said first chamber to atmosphere, a second passage for intermittently bleeding fluid from said first chamber to atmosphere, a valve responsive to the pressure in said first chamber controlling fluid flow through said second passage and adapted to close said second passage when the pressure in said first chamber increases above a first predetermined value and to open said second passage when the pressure in said first chamber decreases below a second predetermined value.

5. In a burner control system: a burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, and a by-pass for said throttling valve controlled by a normally closed low limit valve which, when moved to open position, removes said throttling valve from control of flow through said passage, a first restricted passage for continuously bleeding fluid from said first chamber to atmosphere, a second passage for intermittently bleeding fluid from said first chamber to atmosphere, a valve responsive to the pressure in said first chamber controlling fluid flow through said second passage and adapted to close said second passage when the pressure in said first chamber increases above a first predetermined value and to open said second passage when the pressure in said first chamber decreases below a second predetermined value, and a normally open high limit valve in control of said pipe connecting said first chamber with said conduit and also in control of both said first and second passages and adapted, when actuated to closed position, to close said pipe and said passages and thereby close said main valve independently of said condition responsive throttling valve.

6. In a burner control system: a burner for heating a space, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, an auxiliary throttling valve for controlling flow through said passage, means responsive to the temperature of the space heated by said burner for operating said throttling valve, means permitting continuous but variable bleed of fluid from said first chamber to the atmosphere, said means comprising a valve responsive to the pressure in said first chamber and adapted to decrease the bleed of fluid from said first chamber when the pressure therein rises above a first predetermined value and to increase the bleed of fluid from said chamber when the pressure therein decreases below a second predetermined value.

7. In a burner control system: a burner for heating an enclosure, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, an auxiliary throttling valve for controlling flow through said passage, means responsive to the temperature of the space outside of said enclosure for operating said throttling valve, means permitting continuous but variable bleed of fluid from said first chamber to the atmosphere, said means comprising a valve responsive to the pressure in said first chamber and adapted to decrease the bleed of fluid from said first chamber when the pressure therein rises above a first predetermined value and to increase the bleed of fluid from said chamber when the pressure therein decreases below a second predetermined value.

8. In a system for controlling a main burner having a pilot burner, a conduit connecting said burner to a pressure source of fluid fuel, a main throttling valve in said conduit for controlling fluid flow therethrough and biased to a closed position, a motor for operating said main valve and comprising means defining a first and a second pressure chamber separated by a movable partition, means operatively connecting said partition to said main valve, said connection being such that when pressure fluid is supplied to said first chamber the main valve is urged toward open position against the force of said bias, a fluid connection between said second chamber and said conduit at a point thereon between said main valve and the burner, a fluid passage connecting said first chamber with said conduit ahead of said main valve, a condition responsive throttling valve for controlling flow through said passage, means permitting continuous but variable bleed of fluid from said first chamber to the atmosphere, said means comprising a valve responsive to the pressure in said first chamber and adapted to decrease the bleed of fluid from said first chamber when the pressure therein rises above a first predetermined value and to increase the bleed of fluid fom said chamber when the pressure therein decreases below a second predetermined value, and second value being at a lower absolute pressure then said first value, a safety pilot valve controlling flow through said first mentioned fluid passage and located therein between said first chamber and said condition responsive throttling valve and pilot burner responsive means for operating said safety pilot valve to obstruct said first mentioned fluid passage when said pilot burner is extinguished.

LEWIS L. CUNNINGHAM.

REFERENCES CITED

The following references are of record in the file of this patent:

UNITED STATES PATENTS

| Number | Name | Date |
|---|---|---|
| 1,419,334 | Webb | June 13, 1922 |
| 1,853,194 | Bogle | Apr. 12, 1932 |
| 1,978,701 | Dreffein | Oct. 30, 1934 |
| 1,987,032 | Spence | Jan. 8, 1935 |
| 2,040,109 | Spence | May 12, 1936 |
| 2,362,247 | Converse | Nov. 7, 1944 |